Jan. 22, 1974  D. R. McGILLVARY ET AL  3,787,550
METHOD OF CURING AND/OR SUBJECTING TO PRESSURE
AN ELASTOMERIC ARTICLE
Filed July 6, 1971

United States Patent Office 3,787,550
Patented Jan. 22, 1974

3,787,550
METHOD OF CURING AND/OR SUBJECTING TO PRESSURE AN ELASTOMERIC ARTICLE
Daniel Ross McGillvary, Jackson Township, Stark County, Ohio, assignor to The Firestone Tire & Rubber Company, Akron, Ohio
Filed July 6, 1971, Ser. No. 159,973
Int. Cl. B29c 25/00
U.S. Cl. 264—88          5 Claims

ABSTRACT OF THE DISCLOSURE

The invention involves subjecting an article of manufacture to pressure and/or curing conditions by placing it in a stabilizing liquid of approximately the same specific gravity and subjecting the stabilizing liquid to the action of centrifugal force.

---

In the rubber and plastics industry it is the normal procedure, in forming and curing complicated and involved shapes, to utilize transfer, injection, and compression molds to accomplish this end result. These molds are quite expensive and are relatively difficult to work with under normal conditions. It has always been highly desirable to conceive and provide a system of forming and molding rubber and plastic shapes which involves a relatively cheap and in many cases a disposable mold.

The present invention involves itself with a method of curing and/or subjecting to pressure articles having rather complicated shapes. This particular invention lends itself to the economic production of many complicated rubber and plastic parts, however, it of course can be used in the same manner to produce rather simple parts.

Before proceeding to a more precise description of the present invention and how to carry it out, a brief discussion of some of the principles involved is in order. If one, for the sake of discussion, takes the example of a mold or other container which is filled with a liquid and spun or rotated, it can be said that the liquid will have a higher pressure within itself the further one proceeds from the center of rotation. The liquid will also exert that same pressure gradient on all parts with which it is in contact and in the case of a container filled with liquid this will be true as one proceeds from the center line of rotation to the outermost portion of the container. A flexible mold or member immersed in the rotating liquid will therefore have a distorting force placed upon it, and the force at any given point is a function of the depth of immersion of the flexible mold in the liquid, rotational speed, specific gravity, and the position in which the mold is located with respect to the center of rotation. The present invention contemplates the designing of a flexible mold or container of rubber or some similar material that is sufficiently rigid to maintain its molded shape when it is standing alone and at rest (free standing) but which normally would be distorted under the centrifugal force encountered in normal centrifugal casting operations or like procedures. Next let it be assumed that the specific gravity of the material of the mold is designed to match the specific gravity of the curable rubber or plastic material which is to be contained therein and of which the finished article is to be formed. A liquid is provided which will be the balancing or stabilizing liquid which is of the same specific gravity as the mold material and the curable liquid material and this stabilizing liquid is the liquid into which the mold containing the curable liquid material is immersed.

An example of a complicated shape for the purpose of understanding the present invention may be the shape of a helical spring. A relatively cheap mold may be formed by dipping such a spring into a rubber latex [solution] to form a cover on the spring, thereafter curing the latex and then stripping the resultant helically shaped "balloon" from the spring. The "balloon" may then be filled with a liquid rubber or synthetic plastic material and closed at the end where it was filled and then placed into a stabilizing liquid material which is then rotated to produce a centrifugal force on all of the elements located therein.

As the container with the stabilizing liquid therein is spun or rotated, and since the specific gravity of the stabilizing liquid, the mold material and the curable liquid material are the same, there is no effective distorting force on the mold or "balloon" since all of the forces are now automatically in balance because the same forces are being exerted on one side of the mold as on the other side. The mold, since it is constructed of a material which has sufficient "memory" to return to its original shape, will be free to assume its original molded shape. It will thus be seen that if we have the same force on the outside of the mold as on the inside, there will be no effective distorting force on the mold during the curing and/or hardening process.

This same basic principle or method can be applied to the curing and/or subjecting to pressure of other rubber or plastic shapes. Take for example the case of a rubber washer or the case of a short length of hose or tubing. It is many times desirable to subject such items to a curing or a post curing operation and it is desirable that these curing operations proceed under the influence of pressure which tends to hold or cure the components of the parts more compactly together. Assuming therefore that the part which is to be subjected to this post curing operation is of the same specific gravity as the stabilizing liquid, it is then only necessary to place the part in the stabilzing liquid and subject the container to a rotating action causing centrifugal force to be exerted within the stabilizing liquid and upon the part. Under these circumstances it will be seen that the part is subjected to a compacting force in all directions and on all sides, because the forces exerted at equivalent distances from the radius of rotation will be equal and in all directions, tending to compact the part in the curing operation. It is desirable that the specific gravity of the part be just slightly greater than the specific gravity of the stabilizing liquid so the part will be completely immersed in the liquid and proceed outwardly to the zone of greatest pressure. It will be appreciated that a weight may be added to any part to increase the total weight when the specific gravity of the part is too low. It may also be possible to reduce the specific gravity of the stabilizing liquid. The use of a small weight is very satisfactory when the part is sufficiently delicate and the greatest accuracy desired. The weight can be attached to the mold at the point where it will not affect the accuracy of the molded part. For example, if a small metal washer is attached to the end of the helical balloon (FIG. 5) mold at its closure point, the mold will be drawn outward to the zone of relatively high pressure. The weight will precede the mold and will rest on the outer surface of the container 27 (FIG. 1). The use of this technique allows absolute matching of specific gravity which produces optimum accuracy of shape.

Other objects and a fuller understanding of this invention may be had by referring to the following description and claims, taken in conjunction with the accompanying drawings, in which:

Figure 1:
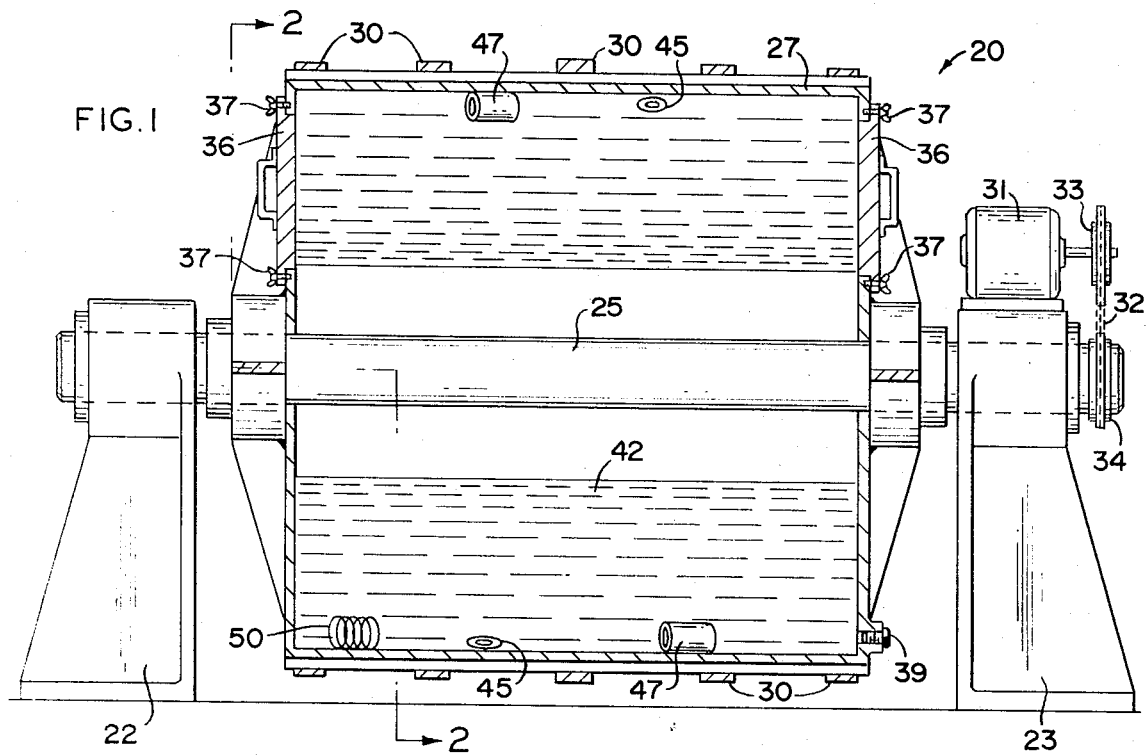
FIG. 1 is an elevational view partially in section of an apparatus which is capable of varying out the method of the present invention.
Figure 2:
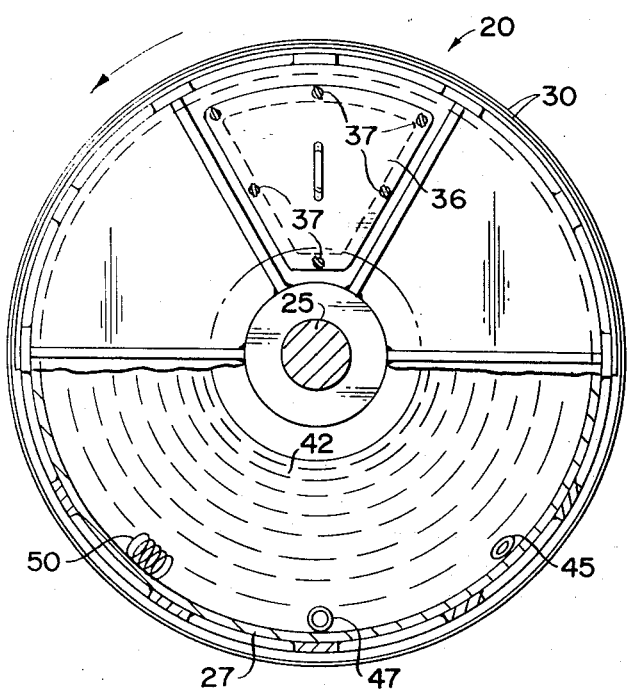
FIG. 2 is an end view taken generally along the line 2—2 of FIG. 1.

Referring specifically to the drawings, FIGS. 1 and 2 show an apparatus 20 designed to carry out the method of the present invention. The apparatus includes mounting pedestals 22 and 23 which serve to journal opposite ends of a rotatable shaft 25. Attached for rotation to the shaft 25 is a large cylindrical container 27 which is reinforced about its circumferential periphery by means of a plurality of axially spaced reinforcing bands all identified by the reference numeral 30. An electric motor 31 is mounted upon pedestal 23 and it is adapted to rotatively drive the shaft 25 and container 27 by means of belt 32 connected to and extending between sheaves 33 and 34 respectively. Access is provided to the interior of the cylindrical container 27 by means of a door 36 which is held in closed position by means of thumb screws 37. A drain or fill plug 39 is also provided in the container and is for the purpose of either filling the container with a stabilizing liquid 42 or for draining the stabilizing liquid from the cylindrical container. FIG. 1 is a representation showing the cylindrical container 27 as being rotated thereby subjecting the stabilizing liquid 42 to centrifugal force so the stabilizing liquid occupies the position shown in FIG. 1 simply because the container is not completely full of liquid 42. In any event the liquid 42 is subjected to the action of centrifugal force upon rotation of the container 27 as aforementioned.

The nature of the stabilizing liquid 42 can be quite varied. It only being necessary that it have a specific gravity of approximately the same (or slightly less) than the specific gravity of the articles which are to be contained therein and treated thereby.

In this regard, FIG. 1 shows several items contained or immersed within the stabilizing liquid. There being shown a washer 45, a length of hose 47 and a hollow helical mold 50 in the configuration of a helical spring and contained within the helical mold is a polyurethane material 52. The polyurethane material is a synthetic resin which in its normal state is liquid and flowable and when subjected to the proper curing conditions becomes cured to a solid condition. The specific discussion of these materials of construction will be elaborated on further in the latter part of this disclosure.

Figure 5:
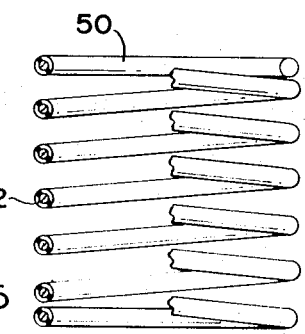
FIG. 5 is an enlarged fragmentary view partially in section of a helical spring formed and cured in the apparatus of FIG. 1 by the use of a mold of latex with the inner and main portion of the spring being formed of a polyurethane material.

The item shown in detail in FIG. 5 and its relation to the invention will first be discussed. It will be appreciated that the helical mold 50 might be produced by many different methods however, for the sake of an understanding of the present invention let it be assumed that an original spring of the configuration of the polyurethane core 52 existed and was constructed of metal. The mold 52 is formed by dipping the helical spring in a rubber latex, permitting the latex to cure or solidify and then stripping the formed latex mold or "balloon" from the metal spring. The helically shaped mold is then filled with the liquid polyurethane material 52 and immersed in the stabilizing liquid 42 in the cylindrical container 27. It should be kept in mind that the helical mold 52 which is produced is flexible in nature and has enough "memory" or resiliency to maintain itself in its molded shape while in its free standing condition, or in other words, when it is subjected to no outside or inside forces. The material of construction of the helical mold 50 is designed to match the specific gravity of the stabilizing liquid 42. The liquid polyurethane material 52 which is capable of curing or hardening to a solid state is also designed so as to have a specific gravity which matches the specific gravity of the material of the helical mold and the specific gravity of the material of the stabilizing liquid 42. A small washer may be attached to the end of the mold, causing the mold to be carried to the surface of the rotating vessel 27 (FIG. 1). As the cylindrical container 27 is rotated it will be seen that the centrifugal force at any particular point within the stabilizing liquid will be of a given value, however, it will be appreciated that the centrifugal force within the mold 50 in the liquid polyurethane material 52 is of the same magnitude and so therefore the distorting force upon the wall of the helical mold 50 will be exactly the same and no distorting force will be exerted thereon. This is true at all positions of the helical mold and as a result the distorting forces are completely counterbalanced and the curing will take place in the shape as shown in FIG. 5. It will be appreciated by those skilled in the art that the stabilizing liquid 42 may be heated to the desired degree for the desired lengths of time in order to effect the curing procedure. It will also be appreciated that once the curing or hardening has been effected that the shape of the helical spring is firmly maintained because of the forces in the stabilizing liquid which tend to compact or firmly hold the material of the spring in the shape shown. Naturally, matching of specific gravities must be done at the temperature which is to be used.

Figure 3:
FIG. 3 is an enlarged view partially in cross section showing a rubber washer which is cured in the apparatus of FIG. 1.
Figure 4:
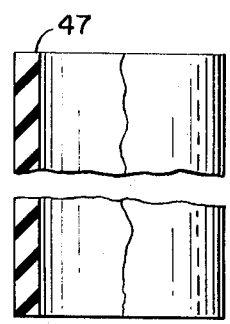
FIG. 4 is an enlarged view partially in section of a length of hose which is cured in the apparatus of FIG. 1.

FIGS. 3 and 4 are enlarged views partially in section showing a washer 45 made of an elastomeric material and a length of hose 47 constructed of the same or a similar material. These items may be immersed in the stabilizing liquid right after they have been originally formed, for example by extrusion, and then by severing by some knife or cutter means so that the curing operation can be effected. If the gravities are matched, again a weight (or some mechanical means) must be used to carry the hose to the outer area of greatest pressure. However, such a hose is stiffer by nature than the helical mold. A slight mismatch of specific gravity may be allowed. If the gravity of the hose is just slightly greater than the fluid, it will proceed to the outer area of its own accord and only a very slight distortion will occur. The hose must be open so that it can be filled with the balancing fluid. As rotation of the container proceeds as aforementioned, centrifugal force is exerted by the stabilizing liquid 42 against the walls of the washer and hose and in all directions but since the specific gravity of these items is the same as the specific gravity of the stabilizing liquid an opposite force is exerted thereby resulting in a net distorting force of zero and the items are conveniently cured and/or subjected to pressure without distortion. The numerical values for the specific gravity of the stabilizing liquid 42 and the part to be immersed therein depend on many factors and should be determined for each particular operating situation. These factors include the viscosity of liquid 42, rotational speed of container 27, stiffness or rigidity of the part being treated and the distance of the part from the axis of rotation.

With respect to the materials of construction which are operable under the teachings of the present invention and referring specifically to the embodiments shown in FIGS. 1 and 5 it can be said that the liquid and hardenable polymeric material 52 to produce the completed helical spring (or other shape) may be a polyurethane material which may have a specific gravity in the range of from 1.03 to 1.30. The material of the helical mold 50 as mentioned hereinbefore may be a rubber latex material which from a practical technical standpoint has the same specific gravity as the polyurethane material 52. In turn the stabilizing liquid 42, which can be essentially any liquid, is designed so that its specific gravity is the same as the specific gravity of the material of the helical mold 50 and the polyurethane material 52. The stabilizing liquid 42 might be a water and salt mixture, an oil or even a polyurethane material with the polymerizing end groups inactivated so the polyurethane material remains in a liquid form. The resinous materials capable of being used for example in the teachings similar to those shown in FIG. 5 are practically unlimited and in a preferred sense they should be resins which are liquids prior to curing. The resin might be those resins which are disclosed in U.S. Pats. Nos. 2,852,483, 2,814,605 and 2,814,606. As mentioned before the materials of construction of the items illustrated in FIGS. 3 and 4 can be unlimited so long as they have the same specific gravity as the stabilizing liquid or vice versa in that the stabilizing liquid 42 be designed to have the same specific gravity as these items.

It will also be appreciated by those skilled in the art that there are many problems involved in attempting to cure long lengths of conventional elastomers such as belting and hose. In many curing installations long lengths of belting and hose are laboriously positioned by hand into large autoclaves where they are subjected to curing conditions and then after the curing has been effected the same laborious procedure must be gone through in order to remove the belting or hose from the autoclaves. It is therefore highly desirable to provide a curing means or system which is capable of continuously curing or subjecting to pressure, continuous lengths of elastomers such as belting or hose. It will be readily appreciated after a review of the above that the present invention is susceptible of modification to continuously cure long lengths of hose or belting. This has not been shown, however, all that need be done is provide the stabilizing liquid 42 under centrifugal force conditions and to feed the lengths of the elastomer into the same which is contained, for example, in a container similar to that shown in FIGS. 1 and 2. It of course is necessary to match the feed rate of the elastomer to the rotational speed of the container or if this is not possible to arrange some means of making up for the differences in speed. It is also possible to physically mount the means for feeding the elastomer and the takeup reel for the elastomer on the rotating container. It will thus be seen that the present invention is capable of readily accommodating the curing or subjecting to pressure, of long lengths of an elastomeric material.

It will therefore be appreciated that the objects as stated hereinabove are completely carried out by the apparatus and method of the present invention and particularly those advantages which do away with the necessity of building relatively expensive and complicated molds for forming and curing relatively complicated shapes. This is all accomplished in this invention by the matching of the specific gravities as mentioned hereinabove and then subjecting the entire mold and its contents and the liquid within which the mold and its contents are contained to the action of centrifugal force. The amount of centrifugal force desired may be varied quite easily mechanically by changing the speed of rotation of the container, depending upon the mechanical strength of the container itself. As described hereinabove, the amount of centrifugal force is also dependent or determined by the amount of pressure or force that one desires upon the article being treated and/or cured. The amount of force exterted will also be a function of the distance of the part from the center of rotation of the shaft 25. It is usually not necessary for the part to travel completely to the outside of the container 27 in order to obtain the advantages of the invention. However, in the case of polyurethane or like material which has not been properly degassed, it is desirable to locate the part out at this position because it is here that maximum pressure is exerted. This pressure will contain the gases and prevent them from exerting a distorting effect while curing is taking place.

The foregoing may suggest to those skilled in the art, that modifications of this invention could find application in any one of many procedures for densifying or conforming fluid materials in various mold systems through the application of gravity matching techniques in a centrifugal system. The use of organic compounds or elastomeric materials as either mold components or productions therefrom is in no way restrictive, as it is foreseen that either or both mold and product could in some embodiment of this invention be entirely inorganic and/or brittle in nature as in either the ceramic or metal casting industries.

Although this invention has been described in its preferred form and preferred practice with a certain degree of particularity, it is understood that the present disclosure of the preferred form and preferred practice has been made by way of example and that numerous changes in the details of construction and the combination and arrangement of parts and steps may be resorted to without departing from the spirit and the scope of the invention as hereinafter claimed.

What is claimed is:

1. The method of hardening a liquid material to a solid condition including the steps of selecting a hollow mold of a material which is deformable under pressure and which has sufficient memory to resume its original shape when the pressure is removed, filling the hollow mold with the said liquid material, selecting a container and placing a stabilizing liquid therein, placing the hollow mold with said liquid material therein into the said stabilizing liquid in said container, the material of the hollow mold, the said liquid material and the said stabilizing liquid all having specific gravities approximately the same, and subjecting the hollow mold with said liquid material therein and the stabilizing liquid to centrifugal force under hardening conditions for the said liquid material, the hollow mold with said liquid material therein being completely immersed in the said stabilizing liquid.

2. The method as claimed in claim 1, wherein the container is rotatable and the centrifugal force is produced by rotating the container.

3. The method of curing and/or subjecting to pressure an article of manufacture comprising the steps of selecting a container containing a stabilizing liquid, said stabilizing liquid having a specific gravity of approximately the same but slightly less than the specific gravity of the article so that the article will sink slightly in the stabilizing liquid, placing the article in the stabilizing liquid and subjecting the stabilizing liquid and article to centrifugal force.

4. The method as claimed in claim 3, wherein the container is rotatable and the centrifugal force is produced by rotating the container.

5. The method as claimed in claim 4 wherein the article of manufacture is constructed of a rubber or elastomeric material.

References Cited
UNITED STATES PATENTS

| | | | |
|---|---|---|---|
| 3,577,635 | 5/1971 | Bergman et al. | 264—313 |
| 2,695,856 | 11/1954 | Firth | 264—265 |
| 1,551,025 | 8/1925 | Gray | 264—347 |
| 3,290,423 | 12/1966 | Hatch et al. | 264—311 |
| 2,323,286 | 6/1943 | Ward | 264—Dig. 40 |
| 2,163,784 | 6/1939 | Gammeter | 264—347 |
| 3,619,865 | 11/1971 | Hazzard | 264—311 |
| 3,010,153 | 11/1961 | Bittner | 264—311 |
| 3,051,992 | 9/1962 | Bradley | 264—347 |
| 2,971,221 | 2/1961 | Schoenbeck | 264—347 |

ROBERT F. WHITE, Primary Examiner

J. R. THURLOW, Assistant Examiner

U.S. Cl. X.R.

264—236, 311, 347, Digest 40